United States Patent Office 3,214,478
Patented Oct. 26, 1965

3,214,478
NOVEL PERFLUOROOLEFIN EPOXIDE POLYETHERS
Alwin S. Milian, Jr., Wilmington, Del., assignor to E. I. du Pont de Nemours and Company, Wilmington, Del., a corporation of Delaware
No Drawing. Filed Apr. 25, 1961, Ser. No. 105,273
2 Claims. (Cl. 260—615)

The present invention relates to novel perfluoroolefin epoxide polyethers, and, more particularly, to "dimers" of perfluoroolefin epoxide polyethers having improved stability.

The fluorocarbon polyethers prepared by the process of the present invention have general formula

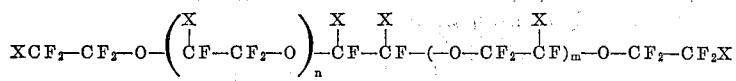

where $n$ and $m$ are positive integers including zero, $n+m$ representing the number of polyether groups having the structure $-CF(X)-CF_2-O-$ in the molecule, and where X is either a fluorine or a perfluoromethyl group. These fluorocarbon polyethers include the group wherein X is perfluoromethyl and $n$ and $m$ are from 2 to 35. The novel perfluoroolefin epoxide polyethers of the present invention are prepared by exposing the polyether obtained by the polymerization of the perfluoroolefin epoxide to ultraviolet light. The reaction, as illustrated with the lowest molecular weight hexafluoropropylene epoxide polyether proceeds as follows:

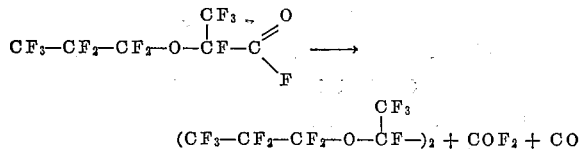

Hexafluoropropylene epoxide polyethers are prepared by the polymerization of hexafluoropropylene epoxide, which itself is prepared by the reaction of hexafluoropropylene with alkaline hydrogen peroxide. A typical procedure for the preparation of the polymer is as follows:

In a dry nitrogen atmosphere, a 500 ml. stainless steel cylinder is charged with 28.6 g. of "Darco" 12 x 20 activated carbon which had been dried for 12 hours at 400° C. in vacuo. The cylinder is cooled to liquid nitrogen temperatures and 400 g. hexafluoropropylene epoxide is charged into the cylinder. The reaction mixture is allowed to come to room temperature at which temperature it is maintained for approximately three days. The reaction mixture is then distilled through a column. Various fractions of the polymer having the general formula

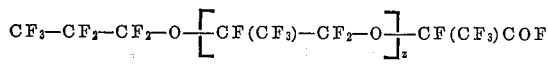

and differing in the degree of polymerization ($z+2$) are obtained. Using the described procedure the conversion to dimer ($z=0$) in a specific example is about 12%, to trimer ($z=1$) about 5.1%, to polymers boiling up to 285° C. at 0.12 mm. Hg pressure ($z=2$ to 35) about 50%, and the polymers boiling above 285° C. at 0.12 mm. Hg pressure ($z>35$) about 3.2%. Approximately 25% of unreacted hexafluoropropylene epoxide is recovered. The dimer and trimer are light solvents, polymers having a degree of polymerization of $z=2$ to 35 may be classified as oils and polymers having a degree of polymerization of $>35$ as non-pourable oils, greases and waxy solids.

Tetrafluoroethylene epoxide is prepared by subjecting a mixture of oxygen and tetrafluoroethylene to irradiation by ultraviolet light, preferably in the presence of small quantities of bromine. Tetrafluoroethylene epoxide can be polymerized to a polyether by the same methods employed in the polymerization of hexafluoropropylene epoxide. Similar products, i.e., dimers, trimers, oils and solids are obtained. The polymer structure for the tetrafluoroethylene epoxide polyether is

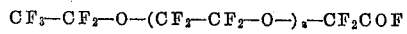

where $z+2$ is the degree of polymerization.

The novel polyethers of the present invention are obtained by exposing the hexafluoropropylene epoxide polyether to actinic radiation of the type usually designated as ultraviolet light. The term "ultraviolet light" is commonly understood to mean light of wave lengths less than 4,000 A., the lower limit of wave length being determined in specific cases by the transmission characteristics of the materials through which the light must pass. The lower limit is usually in the range of 1,800 to 2,000 A. Although light of any wave length between 1,800 to 4,000 A. may be employed in the present invention, wave lengths of 2,500 to 3,700 A. are preferred since they are readily produced and provide sufficient energy to further expedite the desired reaction. Mercury arc lamps are convenient and commercially available sources of such radiation. These may be of several types as is well known in the art and are advantageously contained in a quartz or high transmission glass envelope.

It is desirable that the light source be as close as possible to the reactants and this may be accomplished by placing the lamp immediately adjacent to a transparent wall of the reaction vessel or in a suitable well projecting into the reaction space. In the examples below, a low pressure, 7500 volt mercury resonance lamp containing a trace of argon was employed. This lamp had a quartz envelope and was in the form of a helix which fitted closely around the reaction vessel.

The temperature and pressure of the reaction mixture during conversion are not critical variable and may vary within wide ranges. Although the reactants may be in the gaseous state, it is preferred for reasons of higher efficiency and conservation of space to carry out the reaction in the liquid phase. Higher boiling reactants may be treated at room or elevated temperatures if desired. In general, temperatures from $-80°$ C. to 200° C. are employed. It is also possible to ensure liquid phase conditions by the application of pressures above atmospheric pressure. Reaction times will differ depending on the polyether employed. The completion of the reaction or the degree of completion is readily established by infrared analysis of carbonyl groups in the reaction mixture. The reaction times are selected accordingly. The presence of diluents is not necessary to the reaction although diluents may be beneficially employed in certain cases, particularly when high molecular weight polyethers are used as starting materials. Suitable diluents include in particular perfluorinated saturated fluorocarbons, such as perfluoroheptane, perfluorocyclohexane, perfluorodimethylcyclobutane and perfluorokerosenes.

The invention is further illustrated by the following examples.

*Example I*

Into a quartz tube of 1 mm. thickness and 10 mm. diameter was placed under nitrogen atmosphere a small sample of a polyether of hexafluoropropylene expoxide, non-volatile at 200° C. at a pressure of 0.05 mm., $z>21$. Ultraviolet irradiation was then performed for 32 hrs. with a 7500 volt helical quartz mercury lamp containing a trace of argon. The lamp surrounded the tube containing the sample. After this treatment the sample failed to show the presence of the typical acid fluoride carbonyl groups when analyzed by infrared analysis, otherwise the spectrum was unchanged. When exposed to temperatures of 502 to 520° C. weight losses were approximately 10% per hr., one fourth that of the starting material. Analysis of the the product indicated that it had the structure

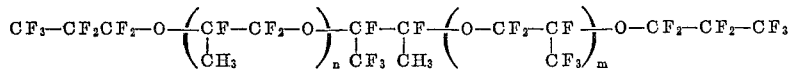

where m and n were on the average greater than 21.

*Example II*

Into a quartz tube was place under nitrogen 28.6 g. of 2-perfluoropropoxyperfluoropropionyl fluoride, formed by the dimerization of hexafluoropropylene epoxide. The material was irradiated for 7 days with the lamp described in the foregoing example, as the source of ultraviolet radiation placed around the tube containing the sample.

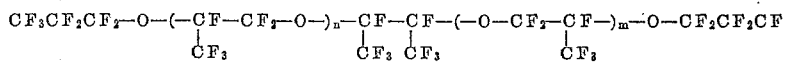

Distillation of the product resulted in 65% yield of 2,3-bis(heptafluoropropoxy)-octafluorobutane, B.P. 130–131° C., as characterized by infrared spectra, nuclear magnetic resonance and combustion analysis for carbon, hydrogen and fluorine.

*Example III*

A 6.75 g. sample of a polytetrafluoroethylene oxide oil having the structure

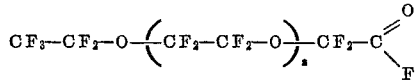

a boiling point in the range of 138–217° C. at 1.5 mm. was irradiated with the ultraviolet light source described in Example I for 90 hours at room temperature. At this time an infrared spectrum indicated complete removal of acyl fluoride end groups, the product having the structure

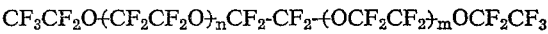

$n$ and $m$ being in the same range as $z$. The completely fluorinated polyether lost weight at the rate of 0.5% per hour at 445° C. in a stainless steel container under an atmosphere of air.

The novel compositions of the present invention have outstanding thermal stability combined with high chemical corrosion resistance. They find utility as solvents, lubricating oils and greases, heat transfer media and dielectric media.

I claim:

1. A novel fluorocarbon polyether consisting essentially of the structure

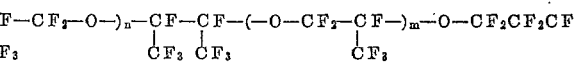

wherein $n$ and $m$ are positive integers of at least 2.

2. A novel fluorocarbon polyether having the structure

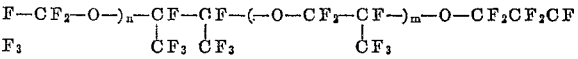

wherein $n$ and $m$ are positive integers from 2 to 35.

References Cited by the Examiner
UNITED STATES PATENTS

| | | | |
|---|---|---|---|
| 2,500,388 | 3/50 | Simons | 260—615 |
| 2,967,810 | 1/61 | Harris | 204—158 |

FOREIGN PATENTS

| | | |
|---|---|---|
| 1,229,090 | 3/60 | France. |

OTHER REFERENCES

Francis et al.: Chemical Society (London), 1955, pp. 2151–2157.

WILLIAM H. SHORT, *Primary Examiner.*

L. W. BURNSTEIN, LEON J. BERCOVITZ, *Examiners.*

UNITED STATES PATENT OFFICE
CERTIFICATE OF CORRECTION

Patent No. 3,214,478                                                    October 26, 1965

Alwin S. Milian, Jr.

It is hereby certified that error appears in the above numbered patent requiring correction and that the said Letters Patent should read as corrected below.

Column 3, lines 10 to 14, the formula should appear as shown below instead of as in the patent:

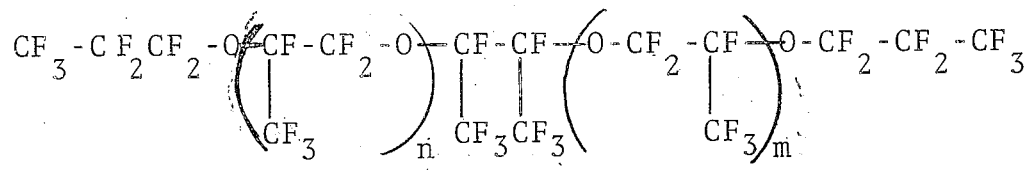

column 4, claims 1 and 2, for the right-hand portion of each formula reading $-O-CF_2CF_2CF$                      read        $-O-CF_2CF_2CF_3$ Signed and sealed this 5th day of July 1966.

(SEAL)
Attest:

ERNEST W. SWIDER                                EDWARD J. BRENNER
Attesting Officer                                 Commissioner of Patents

UNITED STATES PATENT OFFICE
CERTIFICATE OF CORRECTION

Patent No. 3,214,478                          October 26, 1965

Alwin S. Milian, Jr.

It is hereby certified that error appears in the above numbered patent requiring correction and that the said Letters Patent should read as corrected below.

Column 3, lines 10 to 14, the formula should appear as shown below instead of as in the patent:

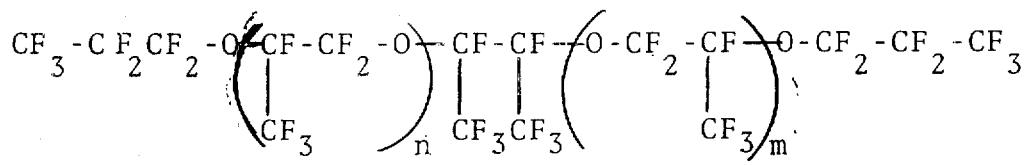

column 4, claims 1 and 2, for the right-hand portion of each formula reading $-O-CF_2CF_2CF$            read      $-O-CF_2CF_2CF_3$ Signed and sealed this 5th day of July 1966.

(SEAL)
Attest:

ERNEST W. SWIDER                          EDWARD J. BRENNER
Attesting Officer                        Commissioner of Patents